TELEVISION CAMERA CONTROL CIRCUIT IN WHICH THE REFERENCE POTENTIAL TO WHICH THE VIDEO SIGNAL IS CLAMPED VARIES ACCORDING TO THE CAMERA TUBE TARGET VOLTAGE

Filed Sept. 15, 1964 2 Sheets-Sheet 1

INVENTOR
BARRY S. BROWN
BY
Robert E. Strauss
ATTORNEY

INVENTOR
BARRY S. BROWN
BY
Robert E. Strauser
ATTORNEY

United States Patent Office 3,339,018

Patented Aug. 29, 1967

3,339,018

TELEVISION CAMERA CONTROL CIRCUIT IN WHICH THE REFERENCE POTENTIAL TO WHICH THE VIDEO SIGNAL IS CLAMPED VARIES ACCORDING TO THE CAMERA TUBE TARGET VOLTAGE

Barry S. Brown, Batavia, N.Y., assignor to Sylvania Electric Products Inc., a corporation of Delaware Filed Sept. 15, 1964, Ser. No. 396,656
7 Claims. (Cl. 178—7.2)

This invention relates to television camera systems and more particularly to means for automatically and simultaneously providing a composite video signal having a substantially constant black-level to blanking-level ratio and a substantially constant black-level to DC reference voltage-level ratio when the voltage applied to the target electrode of a light responsive discharge device is altered to compensate for variations in scene lighting conditions.

In known television camera systems, a light responsive electron discharge pickup device is employed to provide a video signal having both white and black reference levels. The output signal amplitude of such a device varies in relation to the amount of light directed onto the viewed scene; and, if the camera operating conditions remain substantially unchanged during variations in scene brightness, a video signal of varying magnitude is undesirably generated. Therefore, it is desirable to alter the operating characteristics of the camera in accordance with variations in scene brightness.

A known arrangement for altering the operating conditions of a camera system includes a manual adjustment for varying the voltage applied to the target electrode of the pickup device in a manner which provides a substantially constant difference between the white and black reference levels of the video signal. However, varying the voltage applied to the target electrode of light responsive pickup devices generally results in a variation of "dark current" in the video signal. As a result, the above-mentioned constant difference between the white and black reference levels is obtained, but the difference between these white and black reference levels and a constant DC reference level varies.

Additionally, a blanking pulse having a polarity and amplitude for blanking the picture tube in a receiver during the period of electron beam retrace is combined and transmitted with the above-mentioned video signal. The level of this blanking pulse is used as a reference for the black level and is of a value which is referred to as blacker-than-black. The blanking and black levels differ in amplitude in order to insure that overshoots and transients which can occur during the retrace period of the picture tube scanning cycle are not in the scene observed by the viewer. The difference in amplitude between the black reference level and the blanking level is termed the setup, and it is desirable that this setup be maintained substantially constant in accordance with certain prescribed and predetermined standards.

In many of the prior art television camera systems it has been a common practice to provide a manual control for adjusting setup. Each time the voltage applied to the target electrode of the pickup device is altered to compensate for variations in scene lighting, readjustment of the setup is generally required which necessitates operation of the referred-to manual setup control. Obviously, such a manually operated system is not only inconvenient and cumbersome but also requires a skilled operator if consistency and uniformity of result is to be obtained.

Some of these disadvantages have been overcome by circuits which have been devised to automatically alter the setup in response to variations in voltage applied to the target electrode of the discharge device. However, in known types of circuitry for automatically altering the setup, the black reference level is allowed to vary with respect to a DC reference voltage; and such a variation is a serious disadvantage when the resultant video signal is used to DC modulate an R.F. carrier signal. In such cases the brightness of the received picture will change whenever the target voltage applied to the discharge device is changed even though the setup remains substantially unaltered.

Therefore, it is an object of this invention to enhance the operational features of a television camera system.

Another object of the invention is to provide means for automatically maintaining a constant setup and a constant black level with respect to a DC reference level when the target voltage of a light responsive discharge pickup device is altered to compensate for variations in scene lighting.

A further object of the invention is to provide a relatively economic means for automatically maintaining the black reference level of a video signal substantially constant with respect to a DC reference voltage for varying voltages applied to the target electrode of a light responsive discharge device.

These and other objects are achieved in one aspect of the invention by a television camera system wherein a clamping circuit means establishes a video signal at desired level with respect to a DC reference voltage level and a control circuit means automatically alters this desired level in response to variations in target voltage applied to a light responsive pickup device to provide a black reference level which is substantially constant with respect to the DC reference voltage level. Also, a blanking circuit means is provided for adding a blanking pulse to the video signal to provide a composite signal, and a clipping circuit means removes a designated portion of the added blanking pulse. Thus, a constant difference between the black reference level and the blanking level or setup is maintained and the black reference level is also maintained at a constant level with respect to the DC reference voltage level.

For a better understanding of the present invention together with other and further objects, advantages, and capabilities thereof, reference is made to the following disclosure and appended claims in connection with the accompanying drawings in which:

Figure 1:
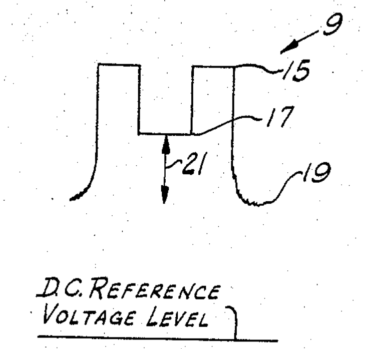
FIG. 1 is a diagram illustrating the signal wave form usually available from a light responsive pickup discharge device at a given scene lighting condition.
Figure 2:
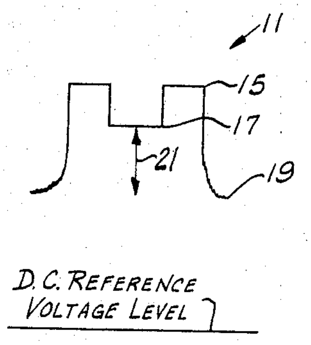
FIG. 2 is a diagram illustrating the variation in the wave form of FIG. 1 when the scene lighting is reduced.
Figure 3:
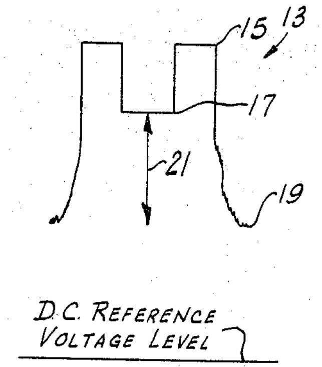
FIG. 3 is a diagram illustrating the variation in the wave form of FIG. 2 when the voltage applied to the target electrode of the light responsive pickup discharge device is increased to compensate for reduced scene lighting.

Referring to the drawings, FIGS. 1, 2, and 3 illustrate typical wave forms available from the target electrode of a light responsive pickup device such as a vidicon tube suitable for use in a television camera system. The wave forms were obtained by viewing a black square outlined in white; and FIG. 1 shows a wave form 9 obtained under average scene lighting conditions; FIG. 2 shows a wave form 11 obtained when the average scene lighting is reduced; and FIG. 3 illustrates a wave form 13 obtained after the voltage applied to the target electrode of the pickup device has been increased to compensate for the reduced scene lighting of FIG. 2.

In FIG. 1, a wave form 9, available from a typical light responsive pickup device directed onto the above-mentioned black square outlined in white, includes a white reference level 15, a black reference level 17, and a device cut-off level 19. The wave form 9 is shown with respect to a DC reference level and, as is well known in the art, the difference between the black reference level 17 and the cutoff level 19 of the pickup device is referred to as the dark current content 21 of the signal.

In FIG. 2, a wave form 11 illustrates a condition similar to the conditions of FIG. 1, except that the scene lighting has been reduced. As can be readily observed, a reduction in scene lighting has caused a reduction in the difference between the white and black reference levels 15 and 17 while the dark current content 21 of the signal remains substantially unchanged.

As indicated hereinbefore, it is desirable to maintain a relatively constant difference between the white and black reference levels 15 and 17 even though the scene lighting is altered.

Accordingly, the maintenance of the relatively constant difference necessitates an alteration in the voltage applied to the target electrode of the light responsive pickup device.

FIG. 3 illustrates a wave form 13 showing a scene similar to that illustrated in FIG. 2 but differing with respect to FIG. 2 in that the voltage applied to the target electrode of the pickup device has been increased to compensate for the reduced scene lighting. As indicated in the drawing, the white and black reference levels 15 and 17 of the wave form 13 have been returned to substantially the same values as obtained under the scene lighting conditions illustrated by the wave form 9 of FIG. 1. However, the increased voltage applied to the target electrode of the pickup device has caused an undesirable increase in the dark current content 21 of the wave form 13. Thus, the constant difference between the white and black reference levels 15 and 17 is maintained, but the increase voltage applied to the target electrode of the pickup device has caused an alteration in the difference between the black reference level 17 and a DC reference voltage level.

As previously indicated, known manual and automatic systems maintain a substantially constant difference between a black level and a blanking level or, as is more commonly known, a constant setup. However, the known systems for maintaining a constant setup do not include a system which automatically maintains a constant setup and also automatically provides a substantially constant black reference level with respect to a DC reference voltage level.

In order to illustrate a television camera system which provides the above-mentioned desirable results, reference is made to FIGS. 4, 5, 6, and 7 wherein there is illustrated the manipulation and additions to a pair of wave forms 23 and 25 by a camera system to be described hereinafter. The wave form 23 depicts a typical signal available from a light responsive discharge pickup device for a given scene lighting condition and target voltage while the wave form 25 illustrates the same signal when the scene lighting has been reduced and the target voltage increased to compensate for the reduced lighting.

Figure 4:
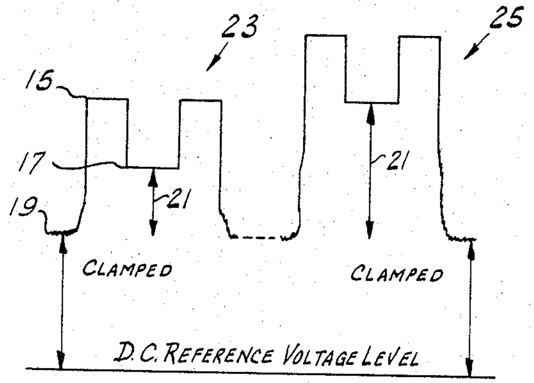
FIG. 4 is a diagram comparing the action of a clamping circuit means on a pair of wave forms available from a light responsive pickup device when the voltage applied to the target electrode of the device is increased to compensate for reduced scene lighting.

Referring to FIG. 4 wherein the same number is used to designate similar parts, the wave forms 23 and 25 include a white reference level 15, a black reference level 17, a pickup device cut-off level 19, and signal dark current constant 21. In the camera system to be described hereinafter, a clamping circuit means fixes both wave forms 23 and 25 at a desired level with respect to a DC reference voltage level, and this desired level is preferably the cut-off level 19 of the light responsive discharge device. As can be readily observed, the wave form 25, obtained when the voltage applied to the target electrode of the light responsive device has been increased to compensate for reduced scene lighting, includes an increased dark current content 21. As a result, the ratio of the black reference level 17 to the DC reference voltage level has shifted from the ratio obtained at the original lighting condition as illustrated by the wave form 23.

Figure 5:
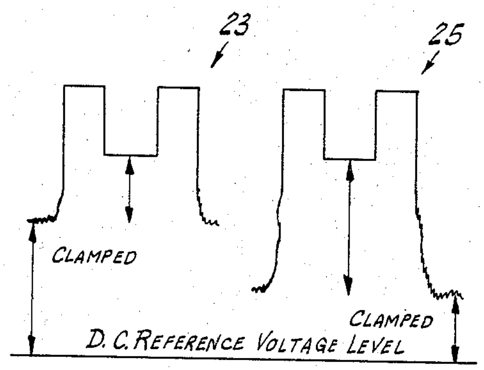
FIG. 5 is a diagram illustrating the manipulation of the wave forms of FIG. 4 by a control circuit means to provide black reference levels of equal DC level.

A control circuit means, to be described hereinafter, varies the above-mentioned desired level at which the wave forms 23 and 25 are fixed by the clamping circuit means with respect to the DC reference voltage level in inverse relationship to the dark current content 21 of the signal. FIG. 5 illustrates the effect on the wave forms 23 and 25 of the action of the control circuit means upon the clamping circuit means. As a result of this variation in the level at which the wave forms 23 and 25 are fixed, the ratio of the black reference level 17 with respect to the DC reference voltage level is maintained substantially constant even though the scene lighting and the voltage applied to the target electrode are both altered.

Figure 6:
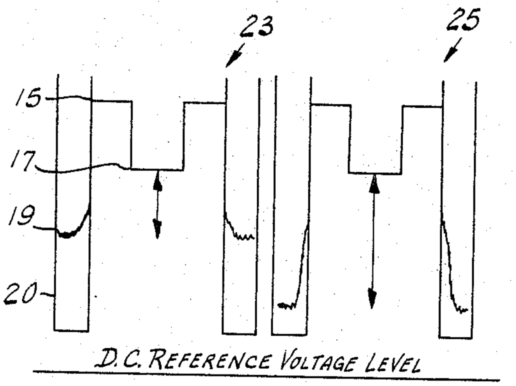
FIG. 6 is a diagram illustrating the addition of a blanking pulse to the wave forms of FIG. 5 to provide a composite video signal.

A blanking circuit means provides a blanking pulse 20, illustrated in FIG. 6, which is added to the video signal during the period when the signal is at the cut-off level 19 of the pickup device to provide a composite signal. Since the blanking pulse is added to the signal during the period of retrace on the picture tube of the receiver and unobservable to the viewer, the blanking pulse 20 is usually of much greater amplitude than the signal and provides assistance in controlling the period during which retrace occurs. However, it should be noted that the addition of a blanking pulse 20 is not a necessity since the dark current content 21 may be used for blanking.

Figure 7:
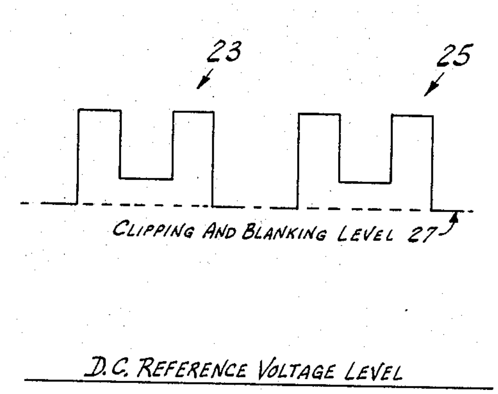
FIG. 7 is a diagram illustrating the action of a clipping circuit means on the wave forms of FIG. 6.

A clipping circuit means is provided for removing a portion of the dark current content 21 or, when a blanking pulse 20 is added to the signal, a portion of the blanking pulse 20 to provide a desired clipping and blanking level 27 as illustrated in FIGS. 6 and 7. Thus, the substantially constant difference in levels between the black reference level 17 and the clipping and blanking level 27 is the desired constant setup. Moreover, the black reference level 17 is substantially constant with respect to a DC reference voltage level as previously described.

Figure 8:
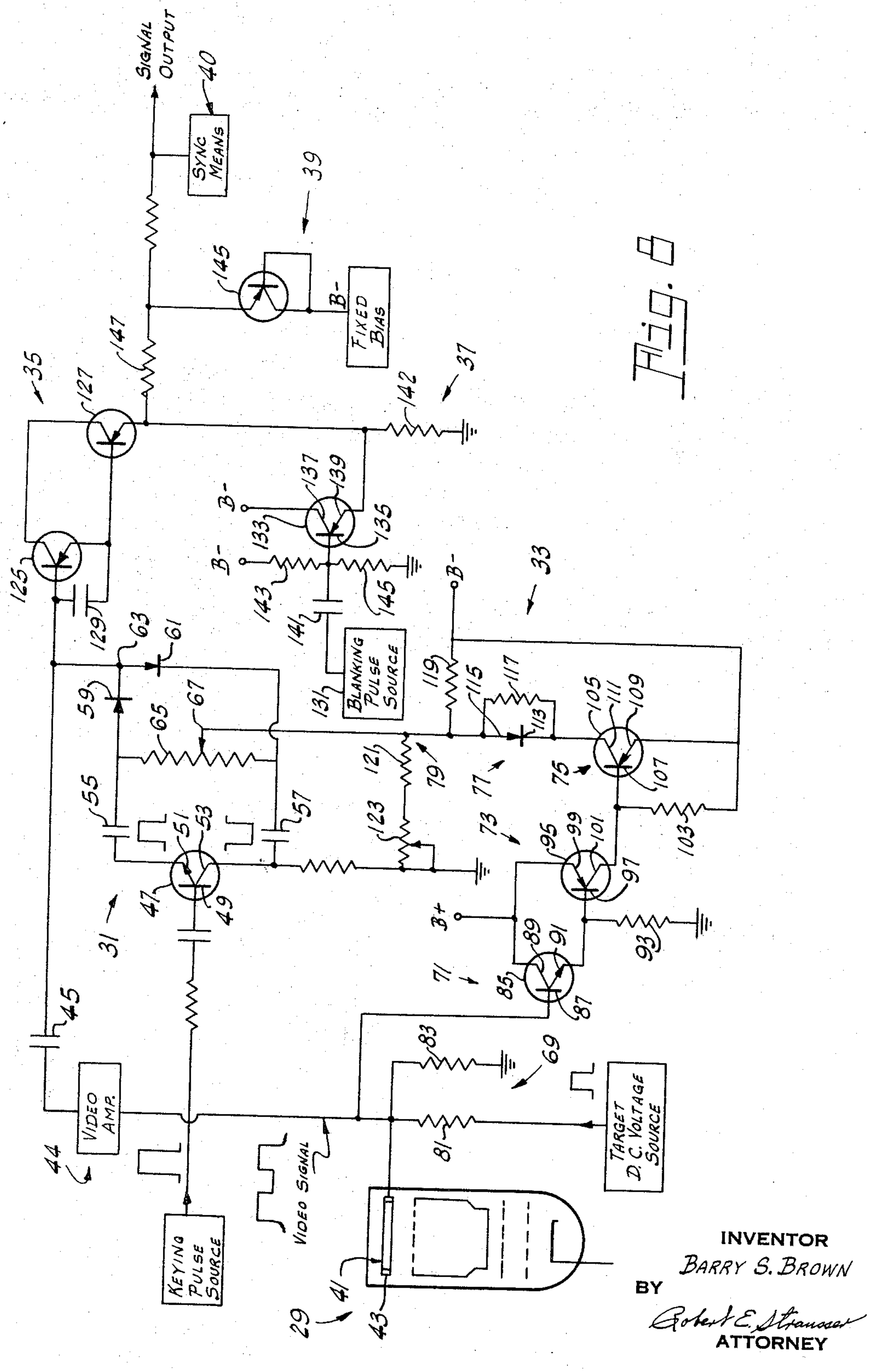
FIG. 8 is a diagram partly in block and partly in schematic form illustrating a circuit arrangement for providing the operations on the wave forms as illustrated on FIGS. 4, 5, 6, and 7.

Referring to the diagram of FIG. 8, partially in block and partially in schematic form, the television camera system includes a light responsive discharge device 29, a clamping circuit means indicated generally as 31, a control circuit means indicated generally as 33, an impedance matching means 35, a blanking circuit means 37, a clipping circuit means 39, and means 40 for adding a synchronizing component to the video signal.

The light responsive discharge device 29 is a light responsive pickup device such as, for example, a vidicon tube. The device 29 includes the usual target electrode 41 having a surrounding metal ring 43 to which a positive DC voltage is applied. A signal is coupled from the metal ring 43 of the target electrode 41 by way of amplifying means 44 and a capacitor 45 to a clamping circuit means 31.

The illustrated clamping circuit means 31 is a double-ended keyed type clamp. However, the clamping circuitry is in no way limited to the illustrated form and other clamping circuit means are equally applicable and appropriate. The illustrated clamp includes a transistor 47 having a base 49, an emitter 51, and a collector 53. The base 49 is AC coupled to a positive-going keying pulse having a frequency equal to the horizontal frequency of the system. The emitter 51 and collector 53 are coupled by way of a pair of capacitors 55 and 57 to a pair of series connected clamping diodes 59 and 61 having a direct connection 63 intermediate thereto. This connection 63 is coupled to the capacitor 45 as well as to an impedance matching means 35. A resistor 65, having a variable contact arm 67, is shunt connected across the capacitors 55 and 57, and the variable contact arm 67 is directly connected to a control circuit means 33.

The control circuit means 33, as illustrated, includes a voltage divider network 69, a first emitter follower stage 71, an amplifier stage 73, a second emitter follower stage 75, a unidirectional conduction device 77, and a variable bias network 79 for the device 77. The divider network 69 includes a pair of resistors 81 and 83 for connecting the DC bias voltage applied to the target electrode 41 of the discharge device 29 to the first emitter follower stage 71.

The first emitter follower stage 71 includes a transistor 85 having a base 87, a collector 89, and an emitter 91. The base 87 is directly connected to the voltage divider network 69; the collector 89 is directly connected to a positive potential source B+; and the emitter 91 is directly connected to circuit ground through a bias developing resistor 93 and to the amplifier stage 73.

The amplifier stage, indicated generally as 73, includes a transistor 95 having a base 97, an emitter 99, and a collector 101. The base 97 is directly connected to the previously mentioned emitter follower stage 71; and the emitter 99 is directly connected to a positive potential source B+. The collector 101 is connected to a negative potential source B− through a current limiting resistor 103 and directly connected to the second emitter follower stage, designated generally as 75.

The second emitter follower stage 75 includes a transistor 105 having a base 107, an emitter 109, and a collector 111. The base is DC coupled to the above amplifier stage 73 and the emitter 109 is directly coupled to the previously mentioned negative potential source B−. The collector is directly connected to the unidirectional conduction device 77.

Additionally, the collector 111 of the transistor 105 may be coupled to a pre-amplifier circuit (not shown) to provide a potential supply source for improving the signal-to-noise ratio of the pre-amplifier. For example, when the scene lighting is increased, the potential required at the target electrode is decreased which causes a decrease in the potential at the collector 111 which is the potential source for the pre-amplifier. As a result of the decrease in supply potential to the pre-amplifier, the gain thereof is reduced and the signal-to-noise ratio improved.

The unidirectional conduction device 77 includes a first and second electrode 113 and 115, respectively, and is shunted by a resistor 117. The device 77 is directly connected intermediate the second emitter follower stage 75 and a variable bias network 79 as well as to the variable contact arm 67 of the resistor 65 in the clamping circuit means 31. The bias network 79 is directly connected between a negative voltage source B− and circuit ground and includes series connected resistor 119, resistor 121, and variable resistor 123.

Connected in series with the signal received from the target electrode 41 of the discharge device 29 is an impedance matching means 35. This impedance matching means 35 may be any one of a number of such devices whereby an impedance transfer is effected. For example, an ordinary emitter follower amplifier stage is both effective and applicable.

Following, a blanking pulse is added to the video signal by way of a blanking circuit means 37 to provide a composite signal. Then, a clipping circuit means 39 removes a desired portion of the added blanking pulse from the composite signal or, when a blanking pulse is not introduced into the signal, a portion of the dark current content 21. As a result, there remains a composite signal having a fixed blanking or dark current level with respect to the black reference level 17, and this fixed difference in levels is known as the previously referred to setup. Moreover, the black level 17 is also constant with respect to a DC reference voltage level.

As to the operation of the system, a video signal having a varying level with respect to a DC reference voltage level is supplied by the target electrode 41 of the light responsive pickup device 29. This varying level is fixed at a constant level with respect to the DC reference voltage level by a clamping circuit means 31. In this clamping circuit means 31, a positive-going pulse having the same frequency as the horizontal frequency of the system is applied to the base 49 of a transistor 47. The pulse remains positive-going in the emitter 51 and is inverted in the collector 53 and applied to a pair of oppositely connected diodes 55 and 57. Also, applied to this pair of diodes 55 and 57 through the variable contact arm 67 of a fixed resistor 65 is a voltage which determines the level at which the signal is clamped with respect to a DC reference voltage level.

During the period when the light responsive discharge device 29 is at the cut-off level, one or the other of the diodes 55 and 57 will conduct, and the cut-off level will be clamped at a fixed level with respect to a DC reference voltage level. Moreover, the fixed level is determined by the voltage applied by way of the variable contact arm 67. Thus, the level at which the video signal is clamped with respect to a DC reference voltage level is determined by the setting of the contact arm 67 regardless of the polarity of the video signal.

Further, the variable contact arm 67 is manually adjustable which permits an initial selection of the video signal setup value. After this initial selection has been made, no further manual adjustments are necessary because of the automatic adjustments provided by the action of a control circuit means 33.

The control circuit means 33 alters the fixed level of the video signal with respect to a DC reference voltage level, as provided by the clamping circuit means 31, in a manner best illustrated in FIG. 5. As previously described, this alteration of the fixed level of the video signal is in inverse relationship to both the dark current content 21 of the signal and the DC voltage applied to the target electrode 41 of the discharge device 29. Moreover, this alteration provides a constant difference between the black reference level 17 and a DC reference voltage level despite the necessary variation in DC voltage applied to the target electrode because of variations in scene lighting.

As to the operation of the control circuit means 33, the voltage divider network 69 is directly connected to the target electrode 41 of the discarge device 29 and monitors any variation in the DC voltage applied thereto. The network 69, having resistors 81 and 83 therein, presents a series impedance of sufficient value to prevent the loading of the target electrode circuit. The varying DC voltage applied to the target electrode 41 is coupled from the junction of the resistors 81 and 83 to the base 87 of the transistor 85 in the first emitter follower stage 71. This follower stage 71 acts to provide a desired impedance transfer. From this first emitter follower stage 71, the varying DC voltage is DC connected to an amplifier stage 73 wherein the usual phase inversion and amplification is provided and then to a second emitter follower stage 75 which is connected as an impedance transfer device. Thus far, a variation in the DC voltage applied to the target electrode 41 is sampled, phase inverted, and amplified.

This amplified and phase inverted voltage is directly applied to a first electrode 113 of a unidirectional current conduction device 77 shunted by a resistor 117 and having a second electrode 115 directly connected to a bias network 79 and to the previously mentioned variable contact arm 65 in the clamping circuit means 31. This amplified and phase inverted voltage available at the first electrode 113 of the device 77 may be, but not necessarily need be, directly connected to a pre-amplifier circuit (not shown) to provide a voltage source which varies in proportion to the voltage applied to the target electrode 41.

The diode 77 is biased to a nonconductive state by the network 79 until the bias is overcome by the amplified and phase inverted voltage applied thereto. This bias is established to provide variations in the clamping circuit means 31 by the control circuit means 33 during the period when the dark current content of the signal is sufficient to create a problem. When the voltage applied to the device 77 overcomes the bias thereon, the device 77 conducts and the voltage at the contact arm 67 is altered to vary the level at which the video signal is clamped with respect to the DC reference voltage level. Further, so long as voltage applied to the conduction device 77 is insufficient to overcome the bias voltage thereon, the resistor 117 permits current conduction and alteration of the voltage at the contact arm 67 whereby the level at which the signal is clamped more closely follows small variations in the voltage applied to the target electrode 41 of the discharge device 29.

Alternately, the resistor 117 shunting the conduction device 77 may be omitted. Under such a condition, the control circuit means 33 is effectively nonoperative, so far as alterations in the level of signal clamping is concerned, until the variation is DC voltage applied to the target electrode 41 and eventually to the conduction device 77 is sufficient to cause conduction through the unidirectional conduction device 77.

Additionally, the unidirectional conduction device 77 may be replaced by a nonlinear device having an operating characteristic of a form which more closely follows the nonlinear dark current additive characteristics of a light responsive discharge device when the voltage applied to the target electrode thereof is varied. For example, a transistor is a suitable and readily applicable replacement for the conduction device 77.

Having once obtained a video signal wherein the black reference level is substantially constant with respect to a DC reference voltage level, the signal is coupled through an impedance matching means 35. The impedance matching means 35 is preferably an impedance multiplier circuit and includes a pair of transistors 125 and 127, respectively, and a shunting capacitor 129. The impedance matching means 35 presents a high impedance path to the DC charge on capacitor 45 in order to provide a substantially contact DC level during the trace period. Also, the capacitor 129 provides a high impedance to low frequencies and a low impedance to high frequencies in order to provide a signal frequency transfer at minimum distortion.

A blanking pulse is added to the output signal of the impedance matching means 35 by way of a blanking circuit means 37. The blanking circuit means 37 includes a source 131 of a blanking pulse and an emitter follower 133 having a base 135, collector 137, and emitter 139. The negative-going pulses are coupled by way of a capacitor 141 and a bias developing network including a pair of resistors 143 and 145, respectively, connected intermediate a negative source B— and circuit ground to the base 135 of the emitter follower 133. The collector 137 is connected to a negative source B— and the output signal is obtained by way of a load resistor 142 connected intermediate the emitter 139 and circuit ground. Thus, a blanking pulse is combined with a video signal having a substantially constant black reference level with respect to a DC reference voltage level to provide a composite signal.

A clipping circuit means 39 is coupled by way of an isolating resistor 147 to the composite signal source at the junction of the emitter 139 and load resistor 142 of the transistor 133. The clipping circuit means includes a diode connected transistor 145 coupled to a bias source B—, and the diode connected transistor is preferred because of the sharper clipping action obtainable therewith as compared with a diode. The clipping circuit means 39 removes a portion of the blanking pulse to provide a remaining blanking pulse portion in the signal, which is at a constant level with respect to both the black reference level and the DC reference voltage level.

Thereafter, synchronizing pulses are added to the signal by any one of a number of means 40 well known in the art, and the composite signal is applied to an output stage. From the output stage, the signal is transmitted in condition for reception by a receiver.

As a brief summation of the operation, assume that a scene having a specific lighting is being viewed and the contact arm 67 of the clamping circuit means 31 has been manually adjusted to provide a desired viewing condition. As the lighting of the scene is decreased, the DC voltage applied to the target electrode of the discharge device is increased. This causes an increased dark current content in the video signal which moves the black level of the signal away from a DC reference voltage.

However, the increase in DC voltage applied to the target electrode is sampled, phase inverted, and amplified, and applied to the unidirectional current conduction device which permits current conduction therethrough. Thereupon, the voltage applied by way of the contact arm is varied and this variation of applied voltage moves the level at which the video signal is clamped closer to the DC reference voltage level such that the black level of the signal remains at a uniform distance from the above-mentioned DC reference voltage level. Thereafter, a blanking pulse is added to the signal and the signal is clipped at a fixed level to provide a constant setup and constant black level to DC reference voltage ratio.

As an illustration of a practical and workable system but in no way to be construed as limiting the concept, the following component values are applicable:

| Transistors: | Resistors (ohms): |
|---|---|
| **47**—Type 2N388 | **65**—100K |
| **85**—Type 2N388 | **81**—10 Meg. |
| **95**—Type 2N404 | **83**—750K |
| **105**—Type 2N404 | **93**—68K |
| **125**—Type MM999 | **103**—6.8K |
| **127**—Type MM999 | **117**—200K |
| **133**—Type 2N404 | **143**—12K |
| **145**—Type 2N706A | **145**—10K |
| | **147**—100Ω |
| Diodes: | Capacitors: |
| **59**—IN276 | **45**—0.0056 μf. |
| **61**—IN276 | **55**—0.47 μf. |
| **77**—IN276 | **57**—0.47 μf. |
| | **129**—100 μμf. |

Thus, means have been provided for automatically obtaining a video signal wherein the black reference level and the blanking level remain at a fixed value to provide a constant setup even though the voltage applied to the target electrode of a light responsive discharge device is varied. Moreover, this black level reference remains fixed with respect to a DC reference level which permits DC modulation of an R.F. carrier signal with a video signal without change in brightness of the received picture. Also, the circuitry is uncomplicated, inexpensive, and includes a means for compensating for variations in the operating characteristics of the light responsive discharge means employed.

While there have been shown and described what are at present considered the preferred embodiments of the invention, it will be understood that various changes and modifications may be made therein without departing from the invention as defined by the appended claims.

What is claimed is:

1. In a television camera system wherein a video signal includes a dark current content which varies directly with the DC voltage applied to a target electrode of a light responsive discharge device and a clamping means coupled to said target electrode establishes said video signal at a reference level with respect to a DC reference voltage level, a control circuit means coupled intermediate said target electrode and said clamping means for automatically varying said clamping means in response to variations in DC voltage applied to said target electrode to cause said reference level to vary with respect to said DC reference voltage level in inverse proportion to the dark current content of said signal.

2. In a television camera system wherein a video signal includes a dark current content which varies directly with the DC voltage applied to a target electrode of a light responsive discharge device and a clamping means coupled to said target electrode establishes said video signal at a reference level with respect to a DC reference voltage level, a control circuit means coupled intermediate said target electrode and said clamping means for automatically varying said clamping means in response to variations in DC voltage applied to said target electrode to cause said reference level to vary with respect to said DC reference voltage level in inverse proportion to the dark current content of said signal, said control circuit means including means for phase inverting said variation in voltage applied to said target electrode.

3. In a television camera system wherein is included means for coupling a video signal from the target electrode of a light responsive discharge device to an amplifier, said signal including a dark current content which varies directly with variations in DC voltage applied to said electrode, an electrical circuit comprising in combination a series connected control circuit means and clamping circuit means coupled between said target electrode and said means for coupling said video signal to said amplifier, said clamping circuit means establishing said video signal at a reference level with respect to a DC reference voltage level and said control circuit means responding to variations in DC voltage applied to said target electrode to cause said clamping circuit means to automatically alter said reference level with respect to said DC reference voltage level in inverse proportion to the dark current content of said signal, and clipping circuit means coupled to said amplifier to remove a portion of said dark current content from said signal, said signal having a remaining dark current portion at a fixed level with respect to said DC reference voltage level.

4. In a television camera system wherein is included means for coupling a video signal from the target electrode of a light responsive discharge device to an impedance matching network and said signal includes a dark current content which varies directly with variations in DC voltage applied to said target electrode, an electrical circuit comprising in combination a clamping circuit means coupled to said signal coupling means intermediate said target electrode and said impedance matching means for establishing said video signal at a reference level with respect to a DC reference voltage level, a control circuit means coupled intermediate said target electrode and said clamping circuit means and responsive to variations in said DC voltage applied to said target electrode to cause said clamping circuit means to vary said reference level of said signal with respect to said DC reference voltage level said variations in said signal being inversely related to said dark current content of said signal, a blanking circuit means coupled to said impedance matching network for adding a blanking pulse to said video signal to provide a composite signal, and a clipping circuit means coupled to said impedance matching network to remove a portion of said blanking pulse from said composite signal, said composite signal having a remaining blanking pulse portion at an established level with respect to said DC reference voltage level.

5. In a television camera system wherein the voltage applied to a target electrode of a light responsive discharge device is varied to compensate for variations in scene lighting, said discharge device providing a signal with levels ranging from white to black depending upon the light input thereto and a dark current content dependent upon the voltage applied to the target electrode thereof, a circuit for automatically providing a composite video signal having a constant blanking level with respect to said black level and a DC reference voltage level comprising in combination:

circuit means coupling said target electrode to an amplifier;

clamping circuit means coupled to said circuit means intermediate said target electrode and said amplifier, said clamping means establishing said signal at a constant level with respect to a DC reference voltage level;

control circuit means coupled intermediate said target electrode and said clamping circuit means and responsive to variations in voltage applied to said target electrode to provide a control voltage to said clamping circuit means, said control voltage having an inverse phase relationship to the voltage applied to said target electrode and inversely related to the dark current content of said video signal to cause said clamping circuit means to alter said established level of said video signal with respect to said DC reference voltage level whereby said black level of said signal is substantially constant with respect to said DC reference voltage level; and clipping circuit means coupled to said amplifier for removing a portion of said dark current content from said altered video signal, said video signal having a remaining dark current content at a fixed level with respect to said black level and said DC reference voltage level.

6. In a television camera system wherein the voltage applied to a target electrode of a light responsive discharge device is varied to compensate for variations in scene lighting, said discharge device providing a signal with levels ranging from white to black depending upon the light input thereto and a dark current content dependent upon the voltage applied to the target electrode thereof, a circuit for automatically providing a composite video signal having a constant blanking level with respect to said black level and a DC reference voltage level comprising in combination:

circuit means coupling said target electrode to an amplifier;

clamping circuit means coupled to said circuit means intermediate said target electrode and said amplifier, said clamping means establishing said signal at a constant level with respect to a DC reference voltage level;

control circuit means coupling said target electrode of said discharge device to said clamping circuit means and including a nonlinear circuit element shunted by a resistor and a bias network for said circuit element, said control circuit means responding to a variation in DC voltage applied to said target electrode to provide an inversely phase related control voltage to said clamping circuit means by way of said circuit element and said resistor shunting said circuit element, said resistor conducting current until said signal from said target electrode applied to said circuit element is greater than the bias voltage applied thereto from said bias network;

blanking circuit means coupled to said amplifier, said blanking circuit means adding a blanking pulse to said video signal from said clamping circuit means to provide a composite signal; and clipping circuit means coupled to said amplifier for removing a portion of said blanking pulse from said composite signal, said composite signal having a remaining blanking pulse portion at a fixed level with respect to said black level and said DC reference voltage level.

7. In a television camera system wherein the voltage applied to a target electrode of a light responsive discharge device is varied to compensate for variations in scene lighting, said discharge device providing a signal with levels ranging from white to black depending upon the light input thereto and a dark current content dependent upon the voltage applied to the target electrode thereof, a circuit for automatically providing a composite video signal having a constant blanking level with respect to said black level and a DC reference voltage level comprising in combination:

circuit means coupling said target electrode to an impedance network;

clamping circuit means coupled to said circuit means intermediate said target electrode and said impedance network, said clamping means establishing said signal at a constant level with respect to a DC reference voltage level;

control circuit means coupling said target electrode of said discharge device and to said clamping circuit means and including a DC series connected voltage divider network, first emitter follower stage, amplifier stage, second emitter follower stage, unidirectional current conductive circuit element having a first and second electrode, and bias network for said circuit element, said circuit element conducting current therethrough when the voltage applied to said first electrode from said target electrode by way of said divider network, first follower stage, amplifier stage, and second emitter stage exceeds the bias voltage from said bias network applied to said second electrode;

clipping circuit means coupled to said impedance network for removing a portion of said dark current content from said altered video signal, said signal having a remaining dark current content at a fixed level with respect to said black level and said DC reference voltage level.

References Cited

UNITED STATES PATENTS 3,180,934 4/1965 Altman et al. -------- 178—7.2

JOHN W. CALDWELL, *Acting Primary Examiner.*

R. L. RICHARDSON, *Assistant Examiner.*